INVENTORS:
PAULUS P. GARDENIERS, DIRK KLAASSEN
AND CHRISTIAAN J. KOLLÖFFEL

2,793,914

APPARATUS FOR TRANSPORTING FINELY DIVIDED SOLID MATERIALS IN CARRIER GAS STREAMS

Paulus P. Gardeniers, Dirk Klaassen, and Christiaan J. Kollöffel, Geleen, Netherlands, assignors to Stamicarbon N. V., Heerlen, Netherlands Application December 30, 1953, Serial No. 401,289

Claims priority, application Netherlands January 2, 1953

1 Claim. (Cl. 302—50)

This invention relates to an apparatus for producing suspensions of finely divided solid materials in carrier gas streams.

It is well known to convey or transport finely divided solids by means of a carrier gas. For this purpose, use is commonly made of a conveyor screw for feeding the solid into the gas stream. This expedient gives rise to the problem of gas escaping along the conveyor screw, and it has been suggested to use a conveyor screw of decreasing pitch along its length, so that the solid material in passing along the screw is compacted sufficiently to form a seal. This compacting of the finely divided solid, however, does not favor the uniform distribution of the solid material in the gas, to form a uniformly dense suspension.

It is an object of the present invention, accordingly, to provide a novel apparatus for continuously producing uniform suspensions of finely divided solid materials in carrier gas streams. A related object is to provide an apparatus for suspending solids in gases, utilizing a simple conveyor screw of constant pitch to feed the solids without leakage of gas. A further object is to provide an apparatus for producing dense suspensions of finely divided solid materials in carrier gas streams, in simple manner and at high rate. Further objects will be in part obvious and in part pointed out hereinafter.

Figure 1:
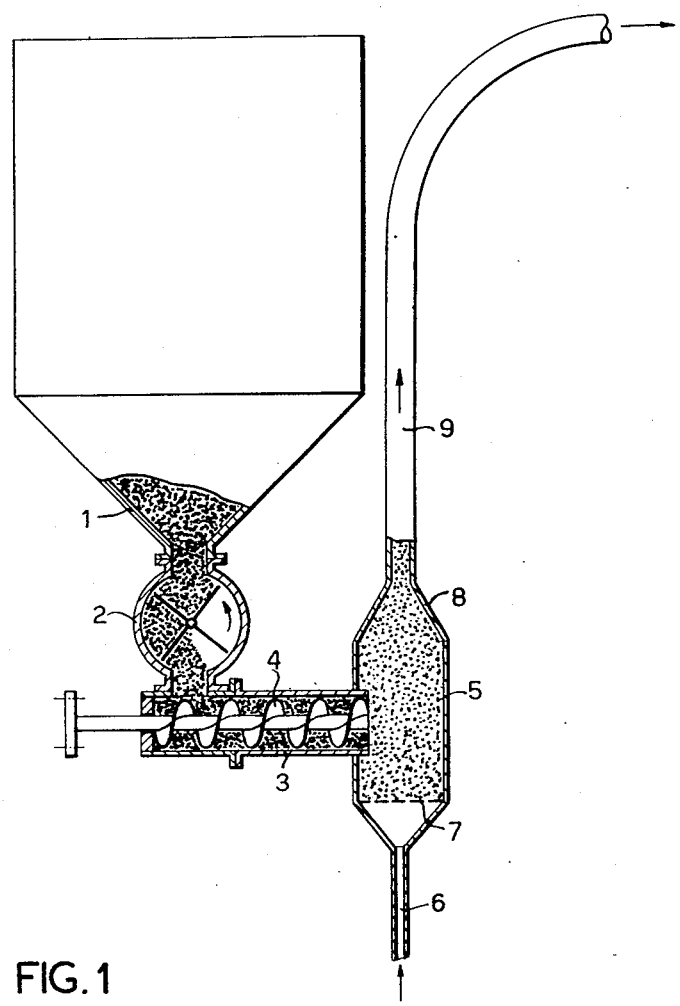
Figure 2:
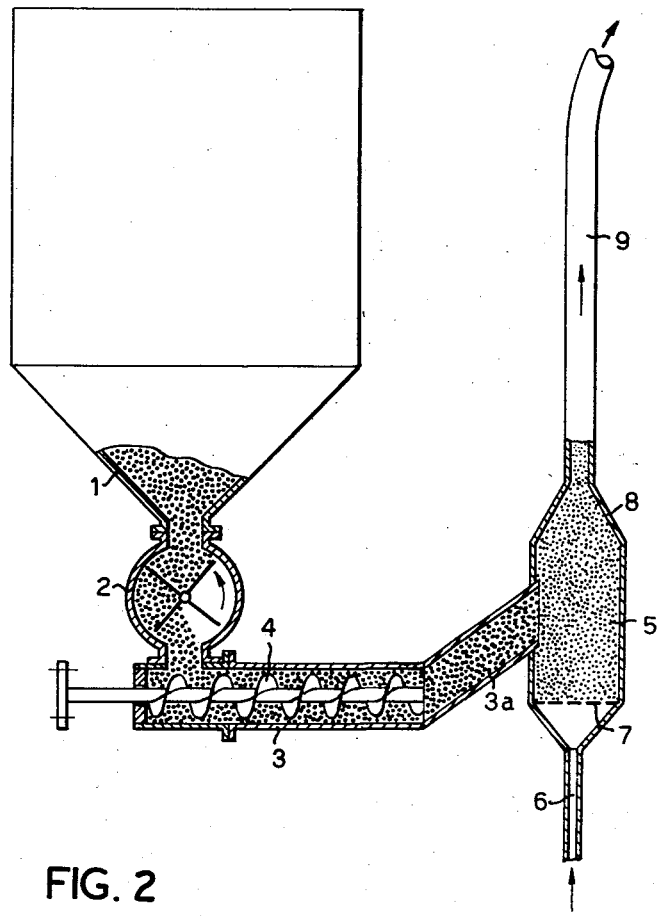

The invention and the novel features thereof will best be made clear from the following description and the accompanying drawings, in which:

Figure 1 is a partly sectional elevational view, somewhat diagrammatic, of a preferred apparatus, and Figure 2 is a similar view of a modified form of the invention.

Referring to the drawings, particularly to Figure 1 thereof, the apparatus comprises a storage hopper 1, communicating through a rotary delivery valve 2 with a supply conduit 3, within which is mounted a conveyor screw 4. The conveyor screw 4 feeds into the side of a vertical mixing chamber 5, which is provided with a gas inlet or supply conduit 6 and a grid 7. The upper part of the chamber converges at 8 into a gas transport line 9.

In operation, finely divided solid is fed from hopper 1 by or through rotary delivery valve 2 to the screw conveyor 4, and the screw conveyor feeds the finely divided solid laterally into chamber 5. Gas is supplied through conduit 6 and distributed over the cross section of chamber 5 by the grid 7. The gas rises upwardly in the chamber to bring the solid entering the chamber from the screw conveyor into a fluidized state. The solid and gas supply are maintained continuously, and the chamber 5 remains filled with fluidized solid, while at the same time gas with solid uniformly suspended therein continuously passes through the converging part 8 of the mixing chamber into the line 9, which conducts the suspension to a desired destination, for example, a reaction space.

Using the illustrated apparatus, if the screw conveyor is operated at a relatively high speed of rotation, for example 500 R. P. M., no gas will escape along the conduit 3. The finely divided solid will be uniformly fed to and distributed through the gas in chamber 5. By reason of the convergence of the upper end of the chamber 5 into the outlet conduit 9, the velocity of the suspension is caused to gradually increase, as a result of which the uniform distribution of the solid particles throughout the gas in the line 9 is further effected and insured.

The use of the grid 7, preferably in the form of a perforated plate, is preferred, as by this means a uniform distribution of the gas over the entire cross-sectional area of the chamber is promoted. The fluidized state can be established and maintained without the use of a grid. Instead of a grid, other forms of distribution devices may be used. If desired in addition to a grid a further distributing device, located below the grid, may be employed to further promote the gas distribution.

The mixing chamber is preferably of cylindrical section, in which case the converging upper end portion of the chamber leading to the gas transport conduit may be conical and coaxial therewith.

The invention may be utilized in suspending and transporting finely divided solids of any type, such as catalysts dispersed on pulverulent carriers, finely divided ores, fine grained carbonaceous material, et cetera, for example to a reaction space situated at a much higher level, which may be at a height of 25 m. or more above the mixing chamber.

Solids with a particle size in the range of from 20 to 250$\mu$ may readily be brought to the fluidized state, and the invention is particularly well suited for application where such solids are to be dealt with. The invention, however, can be utilized with larger particles, ranging for example between 1 and 5 mm.

The dimensions of the mixing chamber may be relatively small. When using a mixing chamber with a capacity of from 25 to 30 litres, a suspension of 50 kgs. of solid per m.$^3$ of gas can readily be obtained with a solids supply rate of 2000 to 2500 kgs. per hour, for carrying over long distances at high velocity. The distances carried may be 40 or 50 m. or more, and a velocity of 10 m. per second is readily obtained.

By producing a high concentration of fluidized particles in the gas in the mixing chamber, and by continuously supplying solid substance into the chamber at such a rate that a fluidized mass of high concentration is maintained in the chamber, the concentration in the transport conduit will also be high, and the apparatus will operate at a high capacity in relation to its dimensions.

For producing a favorable operation of the apparatus, a gas velocity in the mixing chamber between 5 and 100 cm. per second is desirable, and preferably between 20 and 40 cm. per second. The diameter of the gas transport conduit may be so selected as to insure that the velocity of the suspension in said conduit will be several meters per second. For this purpose, the actual diameter of the suspension outlet conduit will depend on the diameter of the mixing chamber. A transport conduit of diameter between 3 and 10 cm. is preferred.

When the transport is to be interrupted, the supply of solid material is first stopped, and then the supply of gas, so that the transport conduit will be emptied by the gas. The mixing chamber, however, remains nearly full of solid material. The apparatus according to the invention has proved to be well suited for conveying finely divided solids to spaces in which the solids are to be treated, in the fluidized state, with vapors or gases.

Under some conditions a more efficient operation of the apparatus may be attained by the embodiment of Figure 2, wherein the apparatus corresponds in all respects to that of Figure 1, except that an upwardly sloped conduit 3a is interposed between the outfeed end of the screw conveyor and the side of the mixing chamber. The upwardly sloped conduit 3a retains a substantially constant amount of finely divided solid therein at all times, which solid effects an almost perfect gas-tight seal. This feature is of importance when the screw conveyor conduit 3 is only partly filled with solid, or when the conduit is entirely empty, as may be the case when shutting down. Under such circumstances, the solid always remaining in the conduit 3a will prevent the escape of gas in any large amount through the conduit 3 and bunker 1. The degree of gas tightness of the body of solids in conduit 3a depends to a large degree on the length of the conduit.

Although the angle of inclination of the conduit 3a may be varied within wide limits, it is preferably such that the entire discharge opening of the conduit into the mixing chamber will be positioned above the highest point of the inlet end opening of the conduit 3a. This arrangement makes it impossible for the carrier gas to escape from mixing chamber 5 to the feed conduit 3 via an unobstructed passage along the inner top side of the conduit 3a, a possibility which sometimes exists in the transport of readily fluidized solids.

We claim:

Apparatus for the upward transport of finely divided solid material comprising a vertically disposed fluidizing chamber, gas distribution means disposed inside said chamber adjacent the bottom thereof, a gas inlet conduit opening into said chamber below said gas distribution means, a fluidized solids outlet at the top of said chamber communicating with an upwardly extended transport pipe, a constant pitch screw conveyor, an upwardly sloped conduit leading from said conveyor into the side of the chamber at a point above said gas distribution means, the outlet opening of said sloped conduit into said chamber being entirely above the inlet opening of said conveyor, and an atmospheric pressure feeding device communicating with said screw conveyor.

References Cited in the file of this patent
UNITED STATES PATENTS

| | | |
|---|---|---|
| 1,200,699 | Bernert | Oct. 10, 1916 |
| 1,304,973 | Heffelfinger | May 27, 1919 |
| 1,755,779 | Goebels | Apr. 22, 1930 |
| 2,304,827 | Jewell | Dec. 15, 1942 |
| 2,636,642 | Gorin | Apr. 28, 1953 |

FOREIGN PATENTS

| | | |
|---|---|---|
| 874,877 | Germany | Mar. 12, 1953 |